(12) United States Patent
Bejerano et al.

(10) Patent No.: US 8,559,358 B2
(45) Date of Patent: Oct. 15, 2013

(54) METHODS AND DEVICES FOR BALANCING THE LOAD ON ACCESS POINTS IN WIRELESS LOCAL AREA NETWORKS

(75) Inventors: Yigal Bejerano, Springfield, NJ (US); Seungjae Han, Basking Ridge, NJ (US)

(73) Assignee: Alcatel Lucent, Paris (FR)

( * ) Notice: Subject to any disclaimer, the term of this patent is extended or adjusted under 35 U.S.C. 154(b) by 2098 days.

(21) Appl. No.: 11/477,912

(22) Filed: Jun. 30, 2006

(65) Prior Publication Data

US 2007/0248033 A1 Oct. 25, 2007

Related U.S. Application Data

(60) Provisional application No. 60/793,305, filed on Apr. 20, 2006.

(51) Int. Cl.
*H04B 7/185* (2006.01)
(52) U.S. Cl.
USPC ............................ 370/318; 455/13.4; 455/522
(58) Field of Classification Search
USPC ............................ 370/328, 338; 455/453, 572
See application file for complete search history.

(56) References Cited

U.S. PATENT DOCUMENTS

| | | | |
|---|---|---|---|
| 6,430,168 B1 | 8/2002 | Djurkovic et al. | |
| 6,937,863 B1 * | 8/2005 | Gordon et al. | 455/446 |
| 7,162,250 B2 * | 1/2007 | Misra | 455/453 |
| 7,296,269 B2 * | 11/2007 | Lin | 718/105 |
| 2003/0060168 A1 | 3/2003 | Teibel | |
| 2003/0134655 A1 * | 7/2003 | Chen et al. | 455/522 |
| 2004/0166871 A1 * | 8/2004 | Backes et al. | 455/453 |
| 2005/0090263 A1 | 4/2005 | Ebata | |
| 2005/0152320 A1 | 7/2005 | Mariner et al. | |
| 2005/0176419 A1 * | 8/2005 | Triolo et al. | 455/423 |
| 2006/0040663 A1 | 2/2006 | Ise et al. | |
| 2006/0142021 A1 * | 6/2006 | Mueckenheim et al. | 455/453 |
| 2006/0223545 A1 * | 10/2006 | Borst et al. | 455/452.1 |

OTHER PUBLICATIONS

M. Balazinska et al., *Characterizing Mobility and Network Usage in a Corporate Wireless Local-Area Network*, In Proc. USENIX MobiSys, 2003.
T. Henderson et al., *The Changing Usage of a Mature Campus-wide Wireless Network*, In Proc. ACM MobiCom 2004, pp. 187-201, Philadelphia, PA, USA, Sep. 2004.
T. Togo et al., *Dynamic Cell-size Control According to Geographical Mobile Distribution in a DS/CDMA Cellular System*, In Proc. IEEE PIMRC'98, vol. 2, pp. 677-681, Boston MA, USA, Sep. 1998.
A. Jalali, *On Cell Breathing in CDMA Networks*, In Proc. IEEE ICC'98, vol. 2, pp. 985-988, Atlanta, Georgia, USA, Jun. 1998.
Proxim Wireless Networks, ORINOCO AP-600 data sheet, 2004.

(Continued)

*Primary Examiner* — Marcos Batista
(74) *Attorney, Agent, or Firm* — Capitol Patent & Trademark Law Firm, PLLC

(57) ABSTRACT

The load on access points (APs) in wireless, local area networks (WLANs) is minimized using a number of methods and associated devices. One method minimizes the load of the most congested APs while a second balances the load on both congested and uncongested APs using an optimal min-max (priority) load balanced solution. The optimal solution is obtained without requiring complex modifications, among other things. Both methods include adjustments to the transmission power levels of AP beacon messages to reduce congestion, but do not require adjustments to the transmission power levels of AP data traffic channels.

26 Claims, 10 Drawing Sheets

(56) References Cited

OTHER PUBLICATIONS

Cisco Systems Inc., Data sheet for Cisco Aironet 1200 Series, 2004.
I. Papanikos et al., *A Study on Dynamic Load Balance for IEEE 802.11b Wireless LAN*, In Proc. COMCON, 2001.
I. Tinnirello et al., *A Simulation Study of Load Balancing Algorithms in Cellular Packet Networks*, In Proc. ACM/IEEE MSWiM, pp. 73-78, 2001.
A. Balachandran et al., *Hot-Spot Congestion Relief in Public-area Wireless Networks*, SIGCOMM Comput. Commun. Rev., 32(1):59-59, 2002.
H. Velayos et al., *Load Balancing in Overlapping Wireless LAN Cells*, In Proc. IEEE ICC'04, vol. 7, pp. 3833-3836, Jun. 1998.
A. Kumar et al., *Optimal Association of Stations and APs in an IEEE 802.11 WLAN*, In Proc. of 11$^{th}$ National Conference on Communication, Jan. 2005.
Y. Bejerano et al., *Fairness and Load Balancing in Wireless LANs Using Association Control*, In Proc. ACM Mobicom 2004, pp. 315-329, Philadelphia, PA, USA, Sep. 2004.
V. V. Veeravalli et al., *The Coverage-Capacity Tradeoff in Cellular CDMA Systems*, IEEE Trans. on Vech. Tech., pp. 1443-1451, Sep. 1999.
S-T. Yang et al., *Resolving the CDMA Cell Breathing Effect and Near-Far Unfair Access Problem by Bandwidth-Space Partitioning*, In. Proc. IEEE VTC 2001 Spring, vol. 2, pp. 1037-1041, May 2001.
L. Du et al., *A Bubble Oscillation Algorithm for Distributed Geographic Load Balancing in Mobile Networks*, In Proc. IEEE Infocom 2004, Hong-Kong, Mar. 2004.
A. Sang et al., *Coordinated Load Balancing, Handoff/Cell-site Selection, and Scheduling in Multi-cell Packet Data Systems*, In Proc. ACM Mobicom 2004, pp. 302-314, Philadelphia, PA, USA, Sep. 2004.
J. M. Jaffe, *Bottleneck Flow Control*, IEEE Trans. on Communications, 29:954-962, 1981.
Y. Afek et al., *Convergence Complexity of Optimistic Rate Based Flow Control Algorithms*, In Proc. ACM STOC, pp. 89-98, 1996.
N. Megiddo, *Optimal Flows in Networks with Multiple Sources and Sinks*, Mathematical Programming, 7:97-107, 1974.
J. M. Kleinberg et al., *Fairness in Routing and Load Balancing*, In Proc. IEEE FOCS, pp. 568-578, 1999.
D. Simone, *802.11k Makes WLANs Measure Up*, Network World, Mar. 29, 2004.
R. Raz et al., *A Sub-Constant Error-Probability Low-Degree-Test, and a Sub-Constant Error-Probability PCP Characterization of NP*, In Proc. of 29$^{th}$ Ann. ACM Sypm. On Theory of Comp, ACM, pp. 475-484, 1997.

* cited by examiner

FIG. 3

```
Routine Calc_Bottleneck_Set (S^0 = {(a, p_a^0)}, B_0, Y)
    B_{-1} = ∅   //used for the termination condition,
    i = 0
    while ((B_i ≠ B_{i-1}) and (∀a ∈ B_i, p_a^i > 0)) do
        i = i + 1
            //Get the simulated state S^i by performing set B_{i-1}
            //power reduction operation from state S^{init}
        for every  AP a ∈ B_{i-1} let P_a^i = p_a^0 - 1
        for every  AP a ∈ A - B_{i-1}  let P_a^i = p_a^0
            // Evaluate the new user association and
            // compute the load on on each AP in state S^i.
        y_a^i = The load of AP a in state S^i.
        B_i = B_{i-1} ∪ {a | a ∈ A ∧ y_a^i ≥ Y ∧ y_a^i > y_a^{i-1}}
    end while
    B = B_i
    return B
end
```

FIG. 4

```
Alg CK_Min_Congestion_Load Alg (A,U)
    for every AP a ∈ A let p_a = K
    End_Flag = FALSE
    while (End_Flag = FALSE) do
            //Find congested APs and their load.
        Y = max_{a ∈ A} y_a
        D = {a | a ∈ A ∧ y_a = Y}
        B = Calc_Bottleneck_Set ({(a, p_a)}, D, Y)
        If ((B = A) ∨ ( exist a ∈ B s.t. p_a = 0)) then
            End_Flag = TRUE
        else
            for every AP a ∈ B let P_a = p_a-1
        end If
    end while
    return {(a, p_a)} | a ∈ A}
end
```

The considered WLAN

Two level gap required to change
the user's association

The inital state

After first iteration, B=(c)

After second iteration, B=(b,c)

FIG. 6

```
Alg LK_Min_Congestion_Load Alg (A,U)
    for every AP a ∈ A let p_a = K
        //Set power indices of all APs to K and evaluate AP load.
    S̄ = {(a, p_a)}
    Ȳ = max_{a∈A} y_a
    End_Flag = FALSE
    while (End_Flag = FALSE) do
    Y = max_{a∈A} y_a
    D = {a|a ∈ A ∧ y_a = Y}
    If (exist a∈D s.t. p_a = 0 ) then
        End_Flag = TRUE
    else
        // Decrease power indices of all APs in D by 1
        // and evaluate AP load.
        for every AP a ∈ D let P_a = p_a-1
        Y = max_{a∈A} y_a
        If (Y < Ȳ)then
            S̄ = {(a, p_a)}
            Ȳ = Y
        end if
    end if
    end while
    return S̄.
end
```

Initial state, D=(c)

After first iteration, D=(c)

After second iteration, D=(b)

After third iteration, D=(c)

FIG. 8

```
Alg Min_Max_Priority_Load_Balancing_Alg (A,U)
    S = {(a, p_a =K)}∀a ∈ A}
    F = ∅
    while (f ≠ A) do
        (S,d)=LK_Minimize_m_Coordinate (S,F)
        F = F ∪ {d}
    end while
    return S
end
    Routine LK_Minimize_m_Coordinate (S^init, F))
        S̄ = S^init
        Ȳ = Y = max_{a ∈ A-F} y_a
        d̄ = d = a s.t. a ∈ A-F ∧ y_a = Y
        End_Flag = FALSE
        while (End_Flag = FALSE) do
            if (pd = 0) then
                End_Flag = TRUE
            else
                Pd = Pd -1   //Power reduction & load evaluation.
                Y = max_{a ∈ A-F} y_a
                d = a s.t. a ∈ A-F ∧ y_a = Y
                    //Check if fixed AP load was increased.
                if (exist a ∈ F s.t. ȳ_a =< y_a) then
                    End_Flag = TRUE
                    //Check if a better network state was found.
                else if (Y < Ȳ) then
                    S̄ = {(a, p_a )}
                    Ȳ = Y
                    d̄ = d
                end if
            end if
        end while
        return (S̄, d̄).
    end
```

After first iteration, F=(c)

After second iteration, F=(c,b)

SSF ·····  Min-Max ———  FRAC ----
Min-Congestion ———  INT —·—

1 level SSF ·····  2 Levels ———  5 Levels ----
10 Levels ———  20 Levels —·—

FIG. 14

| Symbol | Semantics |
|---|---|
| A | The set of all access points (APs). |
| B | The bottleneck set of APs. |
| D (d) | The set of congested APs. |
| F | The set of fixed APs. |
| $g_{u,a}$ | Attenuation of AP a's signal detected by user $u$. |
| K | The maximal transmission power index. |
| $l_{a,u}$ | Load contribution of user u to AP a. |
| $P_a$ | Transmission power of AP a. |
| $p_a$ | Transmission power index of AP a. $p_a \in [0..K]$. |
| $R_{u,a}$ | Signal strength of AP a received by user $u$. |
| S | A network state, $S = \{(a, p_a)\}$. |
| $\overline{S}$ | A recorded network state. |
| U | The set of all users. |
| $U_a$ | The set of users associated with AP a. |
| $y_a$ | The load of AP a. |
| Y | The network congested load. |
| $\overline{Y}$ | The congestion load of the recorded state. |
| $\vec{Y}$ | The AP load vector, $\vec{Y} = (y_1, ..., y_{[A]})$. |

FIG. 15

| Case | Power adjustments | User movements |
|---|---|---|
| 100 random | 102.9(33.3) | 130.7(53.5) |
| 200 random | 84.9(39.5) | 177.2(92.5) |
| 100 hotspot | 119.2(17.9) | 94.6(34.3) |
| 200 hotspot | 101.6(17.5) | 143.6(57.3) |

METHODS AND DEVICES FOR BALANCING THE LOAD ON ACCESS POINTS IN WIRELESS LOCAL AREA NETWORKS

RELATED APPLICATION

This application is related to, and claims the benefit of priority of, U.S. Provisional Patent Application No. 60/793,305 filed on Apr. 20, 2006 entitled "Cell Breathing Techniques for Load Balancing in Wireless LANS", the disclosure of which is incorporated by reference in full herein as if set forth in full herein.

BACKGROUND OF THE INVENTION

In wireless, local area networks (WLANs), a wireless device scans all available channels to detect nearby access points (APs) and then associates itself with an AP that has the strongest received signal strength indicator (RSSI) without taken into consideration the load on such an AP or on other nearby APs. Recent studies on operational IEEE 802.11 WLANs have shown that traffic loads are often unevenly distributed among APs within a WLAN. Typically, at any given point in time some APs tend to suffer from heavy loads (so-called "congested" APs) while others do not. This situation creates a load imbalance within a WLAN. Load imbalances are undesirable because they hamper a network from fully utilizing its capacity and prevent the network from providing services in a fair and even manner.

Currently the IEEE 802.11 WLAN standard does not provide a set method to resolve load imbalances. To overcome this deficiency, various load balancing schemes have been proposed by both academia and industry. Most of these methods take the approach of directly controlling user-AP associations by deploying proprietary client software or specially designed WLAN cards in devices (e.g., computers) operated by users. In these approaches APs broadcast their load levels to user devices (sometimes referred to as just "users") via modified beacon messages, and each user chooses the least-loaded AP.

Although such a user selection approach can achieve load balancing, the deployment of proprietary client software/hardware to all (or most) user devices is difficult to achieve. For example, today users access a variety of WLANs such as hotels, airports, shopping centers and university campuses. These different networks are managed by different organizations that have most likely adopted different load balancing mechanisms. It is unrealistic to expect users to have multiple, different client modules; one for each different network.

Therefore, it is desirable to provide new load-balancing schemes that do not require the use of proprietary client modules and the like.

Other types of networks also face load-balancing challenges. For example, in CDMA cellular networks an increase in the number of active users in a cell causes an increase in the total interference sensed at the cell's base stations. This causes the cell to become congested. When a cell becomes congested, devices being operated by users within the cell need to transmit at higher power levels to overcome the effects of interference in order to ensure signals they are transmitting to base stations are received at acceptable signal-to-interference ratios. As power levels within a cell increase, the signals generated cause increased interference with neighboring cells. As a result, the overall capacity of a network containing such cells begins to decrease. To overcome these unwanted increases in interference, so-called "cell breathing" techniques have been developed. Generally speaking, however, existing cell-breathing techniques developed for CDMA networks do not work well in WLANs.

Because WLANs face similar load-balancing challenges as in CDMA networks the present inventors began to study how to solve these challenges by first realizing the shortcomings of existing cell breathing techniques. For example, referring to FIG. 1(a), there is shown a WLAN 1 with three AP's, a, b and c that are assumed to be transmitting at the same maximal power level. For the sake of simplicity, we will assign a number of users to each AP. In FIG. 1(a), 1 user is initially assigned to AP a, 8 to AP b, and 1 to AP c. In this example, we define the load of an AP to be the number of its assigned or associated users. Given this scenario, AP b has a much higher load than APs a and c. In accordance with an existing cell breathing technique, to reduce the load on AP b its transmission power must be reduced. This leads to a reduction in the transmission range/cell size of b. In FIG. 1(a) the range shrinks from boundary 101 to 102, for example. As is illustrated in FIG. 1(a), the four users/devices 1-4 located farthest away from AP b are affected by this reduction in cell size. At its original size, users 1-4 are within the cell and, therefore, within range of AP b transmissions. As the cell shrinks from size 101 to 102 the users 1-4 find themselves located at the very edge of AP b's range (and sometimes outside the range of course). Being farther away from AP b typically results in a decrease in signal quality at the devices used by users 1-4. In response to the detection of a lower signal quality, the devices used by users 1-4 initiate scanning operations to select an AP associated with a higher signal quality. For example, two of the users 1-2 in FIG. 1(a) may detect a higher signal quality from AP a, while users 3-4 detect a higher signal quality from AP c. Once a higher signal quality is detected, in accordance with an existing cell breathing technique, the users are shifted to APs a and c, respectively. As illustrated in FIG. 1(b), the net effect is to more evenly distribute the load/users within WLAN 1 (i.e., because 3 users are now assigned to AP a, 4 to AP b, and 3 to AP c).

However, a reduction in the transmission power of AP b affects the signal quality of the channels/links between AP b and all of the users within its cell, not just users 1-4. Thus, users/devices 5-8 that are not shifted to another AP (i.e., remain associated with AP b) also detect lower signal qualities. In response, the devices used by users 5-8 may have to communicate at a lower bit rate. At slower bit rates, it may take longer for information (sometimes referred to as "traffic") to be transmitted from a user 5-8 to AP b. This effectively increases the load contributed by each user 5-8 on AP b (if the AP load is determined by considering not only the number of users but also effective user throughput). Thus, instead of reducing the load on an AP, existing cell breathing techniques may actually increase the load.

Accordingly, it is desirable to provide methods and devices that avoid or minimize load imbalances within wireless networks. In particular, it is desirable to provide more effective cell breathing methods (and associated devices) that can be used to minimize load imbalances within WLANs.

SUMMARY OF THE INVENTION

The inventors have discovered methods and devices that minimize load imbalances within wireless networks, such as WLANs, yet avoid the above-described imbalances. In accordance with the present invention, the transmission power level used to transmit data/traffic is separated from the transmission power level used to transmit beacon messages; only the latter is reduced.

By maintaining the power level used by an AP to transmit data, the transmission bit-rate of devices within range of the AP are maintained. However, because each user/device within an AP, or those approaching an AP, determines whether or not to remain assigned (or become assigned) to an existing AP or switch to another AP by detecting and evaluating the signal quality of separate beacon messages from the AP it is presently assigned to (or seeks to become assigned to), by reducing the power level used to transmit beacon messages the present invention, in effect, shrinks the size of an AP's cell(s). Consequently, this discourages new users from becoming assigned to an AP. In the case where an AP is already congested, this prevents the AP from becoming further congested.

Reducing the traffic load on an AP is part of the solution to avoiding load imbalances. The other part is directing or redirecting (collectively "directing") traffic from one AP to a neighboring AP that is not overloaded.

The combination of reducing the traffic load on one AP while increasing the load on a suitable, neighboring AP balances the traffic load within a WLAN.

In contrast to previous attempts to balance traffic loads within a WLAN that rely mainly on local optimization heuristics, the present invention uses optimal cell dimensioning methods (and associated devices) to find deterministic min-max load balancing solutions.

The methods and devices provided by the present invention are also particularly attractive because they do not require user assistance or the modification of existing 802.11 standards, unlike most existing proposals for WLAN load balancing.

Instead, the methods provided by the present invention may be implemented by changing software which controls existing devices. More particularly, for example, by changing software used by a network controller or management unit that is located at a network operations center (NOC).

In one embodiment of the invention, such a controller is operable to decrease an AP's cell size by changing the transmission power of the AP's beacon messages without changing the transmission power of the AP's data traffic channel. Thereafter, the controller directs users/devices near a boundary of the cell to less congested APs. Today, available APs already support multiple transmission power levels, so the inventors believe the present invention may be implemented easily by, for example, distributing/downloading software updates to existing APs.

Further, the novel cell breathing methods provided by the present invention are not tied to a particular load definition, but support a broad range of load definitions. The load contributions may be as simple as the number of users associated with an AP or can be more sophisticated to take into account factors like effective transmission bit-rate, average traffic demand or multiplicative user load contributions.

In further embodiments of the invention, methods and controllers provided by the invention operating at a network operation center (NOC) or the like collect load and association information from APs (e.g., via Simple Network Management Protocol, "SNMP", messages). Depending on the extent of the available information, one of two models or methods (the two words may be used interchangeably herein) may then be used to carry out load balancing. The first is a complete knowledge (CK) model, in which potential user-AP associations and their corresponding AP loads are known a priori for all possible beacon power assignments. Because such information may not be readily available, the present invention also provides a limited knowledge (LK) model in which the user-AP associations and AP loads for only the current beacon power assignments are available. The CK model serves as a building block for the more practical LK model.

Each of the models provided by the present invention involves, in general, two steps. The first step is minimizing the load on the most congested APs, whose load is called the congestion load. The present invention provides two polynomial time algorithms/methods (hereafter referred to as "methods" or "method") that find optimal solutions, one for each model. This is a significant achievement because load balancing problems are known to be strong NP-hard (i.e., very difficult to solve within a determinate amount of time). Further, it is particularly significant that the present inventors have discovered a polynomial-time optimal method that can be used in the LK model. In accordance with the present invention, the solutions provided to solve load balancing problems are based on the insight discovered by the inventors that, as long as current AP power level settings 'dominate' optimal power level settings (i.e., each AP has the same or higher power level than the power level in an optimal solution), an optimal solution can nonetheless be obtained by carrying out a sequence of power reduction operations. In one exemplary method provided by the present invention, beginning from a maximal power level, the power level of a selected set of APs is iteratively reduced. In the CK model, the concept of a bottleneck set is used to ensure convergence to an optimal solution. After reducing the power level of all APs in the bottleneck set, the load of each AP is guaranteed to stay the same or strictly lower than the initial congestion load before the power level reductions. For the LK model a different approach, termed optimal state recording, is used in which the power levels of congested APs are gradually reduced until the power cannot be reduced any further, all the while recording the best solution found after each reduction in power.

The second step involves solving the problem of finding a so-called min-max load balanced solution(s). Though the proofs have been omitted for the sake of clarity/brevity herein, the inventors have discovered/proved that this is also a strong NP-hard problem to solve and that there exists no acceptable method of approximating a solution. More specifically, the inventors proved that there exists no method that guarantees any coordinate-wise approximation ratio, and the approximation ratio of any prefix-sum approximation algorithm is at least P(log n), where n is the number of APs in the network. Undeterred, the inventors discovered a variant of the min-max problem, termed priority load balancing, whose optimal solution can be calculated in a polynomial-time for both models. In priority load balancing, the AP load is defined as an ordered pair of the aggregated load contributions of the AP's associated users and a unique AP priority. Using optimal state recording, a method was constructed that iteratively computes each coordinate of a min-max priority load balanced solution(s).

BRIEF DESCRIPTION OF THE DRAWINGS

FIG. 3 depicts an example of a software program that may be used to compute a "bottleneck set" in accordance with the present invention.

FIG. 4 depicts an example of a software program that may be used to execute a complete knowledge method of the present invention.

FIG. 6 depicts an example of a software program tat may be used to execute a limited knowledge method of the present invention.

FIG. 8 depicts an example of a software program that may be used to execute a min-max priority load balancing method of the present invention.

FIG. 14 is a list of some of the symbols used throughout this discussion and their exemplary meanings.

FIG. 15 depicts exemplary run-time statistics for a controller or the like that executes a limited knowledge method provided by the present invention.

DETAILED DESCRIPTION OF THE INVENTION, WITH EXAMPLES

Figure 1A:
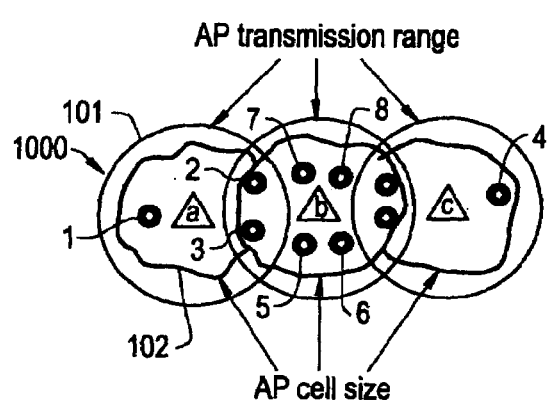
FIGS. 1(a) and (b) depict examples of WLANs used to illustrate features of the present invention.
Figure 1B:
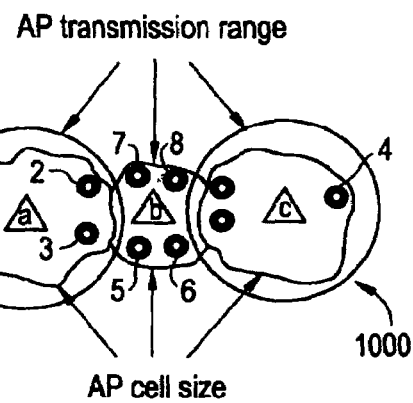

Referring again to FIG. 1(a), there is shown a WLAN 1000 with a set of APs, denoted by a-c. Though not shown, it should be understood that all of the APs a-c may be directly attached to a wired infrastructure, e.g., the Internet. Each AP a-c has a certain transmission range and it can serve only those users 1-8 within its range. Further, each AP a-c may be configured to use one of a plurality of transmission power levels. For the sake of simplicity, it can be assumed that the APs a-c are deployed to ensure a high degree of overlapping between their ranges so that every user 1-8 is covered by at least one AP even when all APs are transmitting at a minimal power level.

Further, it can be assumed that users 1-8 have a quasi-static mobility pattern. In other words, users can move freely, but they tend to stay in the same relative location for a long period of time. At any given period of time, each user 1-8 is associated with a single AP a-c. Each AP a-c periodically transmits beacon messages to "advertise" its presence. When a user enters WLAN 1000, her associated device scans all channels within the WLAN 1000 in order to detect the beacon messages. After detecting beacon messages, the user's device is further operable to measure the RSSI of each message detected. Typically, the device then initiates a process to create a link between it and the AP associated with the strongest measured RSSI. Thereafter, whenever the signal quality of the link the user has established begins to deteriorate below a certain threshold, the device associated with the user once again initiates a process that scans all of the beacon messages to determine whether there is a stronger signal. If so, the user/device tries to establish a new link with the AP associated with the stronger signal.

The method just described balances the load on APs within a WLAN by discouraging new users from becoming associated with a congested AP. However, this may not provide immediate relief to a congested AP. For immediate relief (i.e., load reduction), users/devices already associated with the congested AP need to be reassigned away from the congested AP. To do so, what is needed is a way to encourage, so-to-speak, such users/devices to invoke their scanning operations in order to detect a beacon message from another AP. There are a number of ways this can be done. One way is to trigger association shifts after the cell range of an AP is altered. Hereafter, we limit our discussion just to the power level of beacon messages. That is, hereafter, when the terms "transmission power" or "power levels" or "state" are used, they relate to only the power used to transmit beacon messages unless otherwise noted or unless the context indicates otherwise.

As indicated above, the first step in minimizing load imbalances is to minimize the load on APs within a WLAN. In one embodiment of the invention, the CK model is used to minimize loads. In an alternative embodiment the LK model is used.

A network can be said to have "complete knowledge" when it (e.g., a controller within a NOC) is able to detect or collect the potential signal attenuations and load contributions associated with every user-AP pair within a WLAN. A complete knowledge state is feasible when all of the users collect RSSI information from all nearby APs and send it to a controller located at the NOC. Unfortunately, this capability is not currently available in most existing WLANs. Nonetheless, the CK model is useful as a building block for the LK model which uses current load and user assignments.

A network can be said to have limited knowledge when it (e.g., a controller located at an NOC) is only able to detect or collect information concerning the set of users that are currently assigned to each AP and the load contribution of each such user on the AP it is assigned to.

In accordance with an embodiment of the invention, in the CK model, a controller may be able to a priori determine user-AP assignments/associations in all potential states without actually changing the state of a WLAN. This allows the NOC to perform off-line calculations for a desired state. Such off-line calculations are not feasible in the LK model.

To overcome problems relating to convergence (i.e., though the load on a congested AP decreases, the load on another AP increases) of either model to an optimal balanced state the present invention provides for the use of the following two additional approaches. For the CK model, the present invention first computes a so-called bottleneck set power reduction. This approach involves performing a sequence of set power reductions that monotonically converges to an optimal state. This ensures that a congestive load does not increase. As for the LK model, the present invention first uses optimal state recording. In this approach, records of the best state found so far are kept.

In accordance with the present invention, a bottleneck set can be defined as the minimal set of APs that contains all congested APs (with load Y) as well as all APs whose load may elevate to Y or above as a result of carrying out set power reductions. The present inventors have developed a formal expression for the bottleneck set. However, this expression is not needed for an understanding of the present invention and has been omitted herein. Instead, we now present one example of a bottleneck set.

Figure 2A:
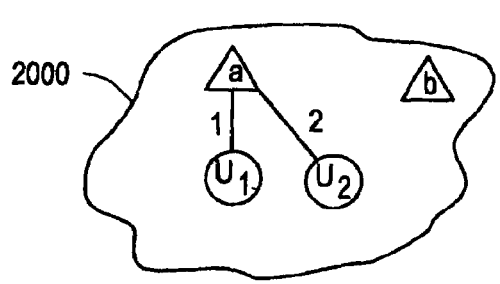
FIGS. 2(a) and (b) depict additional examples of WLANs used to illustrate features of the present invention.
Figure 2B:
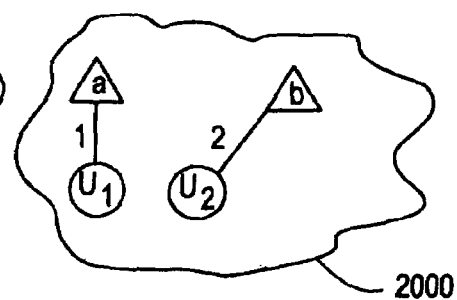

Consider the WLAN 2000 shown in FIG. 2(a). When APs a,b have the same power level a reduction in the power level of AP a decreases its load from 3 to 1, while increasing the load on AP b to only 2. Thus, the bottleneck set at this moment can be said to contain only AP a. When a has a lower power level than b, as illustrated in FIG. 2(b), however, reducing the power level of b reduces its load from 2 to 0 and increases a's load to 3. In this case, the bottleneck set contains both APs a and b. For the sake of completeness, an example of a software program/routine provided by the present invention which may be used to compute a bottleneck set is depicted in FIG. 3.

In the case where a controller has complete knowledge of a WLAN, the bottleneck set of the WLAN can be easily calculated. First, the RSSI between each AP a and each user is calculated. This information allows the controller to determine the initial user-AP assignments/associations, the load on each AP a, and the maximal load Y. From these the controller can compute a bottleneck set using formulas developed by the present inventors. Again, the details of such formulas are not necessary for an understanding of the present invention, though, as noted above, one example of a routine to compute a bottleneck set is set forth in FIG. 3. Suffice to say that the net result of all of the proofs derived by the inventors is the following discovery: that the bottleneck set for a given WLAN is the smallest set of APs that contains a set of congested APs that is arrived at using power reductions which do not increase the load on any other AP to a maximal load Y or higher. Having computed the bottleneck set of APs, controllers provided by the present invention next use this set to minimize congestion on APs within a WLAN where the controller has complete knowledge of the WLAN.

In accordance with one embodiment of the invention, the CK method minimizes congestion by initially assuming that all APs are in a maximal power state and transmit at their maximal transmission power. Thereafter, the CK method executed by a controller in accordance with the present invention iteratively calculates a bottleneck set. Using the calculated set, the method next determines whether another power reduction operation needs to be applied or whether an optimal state is found. To this end, the CK method makes use of two termination conditions (i.e., conditions which trigger the end of power reductions). The first condition determines whether the bottleneck set is equal to the complete set of APs. This condition may be satisfied when the load on all APs within a WLAN is balanced such that further power reductions will cause some of the APs to become more congested, not less. The second condition determines whether the bottleneck set contains an AP that is transmitting using a minimal power level. If so, the power level of all of the APs in the bottleneck set cannot be equally decreased and the method is terminated. Such a case typically occurs when the CK method determines that the load on APs within a WLAN is not balanced and continues to attempt to reduce the maximal load by repeatedly reducing the power level of congested APs. An example of a software program or routine for carrying out a CK method in accordance with the present invention is shown in FIG. 4.

FIG. 5(*a*) depicts an example of a WLAN 3000 where the congestion on APs a, b and c within WLAN 3000 has been minimized using an exemplary CK method of the present invention. As shown, in addition to APs a, b and c, WLAN 3000 contains exemplary users, $u_1, u_2, u_3, u_4$ and controller 3001. In accordance with embodiments of the present invention, APs a, b and c are operable to provide the controller 3001 with their associated users, loads and additional relevant information. Upon receiving and analyzing this information, the controller 3001 is operable to execute the methods provided by the present invention, including the CK method presently under discussion.

Continuing, each of the APs a, b and c may operate at 3 different power levels, 0, 1 and 2. In FIG. 5(*a*), user-AP assignments/associations are depicted as solid or dotted lines, where the solid lines indicate when each of the APs transmit at the same power level (default associations) and the dotted lines indicate other possible associations. The number on each line indicates the contribution by a user to the load on its associated AP. For example, $u_1$ can only be associated with a and contributes a load of 4. $U_3$ can be associated with each of the APs, and it contributes a load of 2. $U_3$ preferably chooses the AP with the highest power level, but in case of a tie it prefers c. If c is transmitting at a lower power level than a and b it prefers b. An asterisk indicates that a gap of two power levels is required to shift a user, e.g., $u_2$ can change its association from a to b only if the power level of AP a is 0 and the power level of AP b is 2.

At an initial state shown in FIG. 5(*b*), all of the APs have the same power level/index, 2, and the load on each AP a, b and c is 7, 0 and 12, respectively. In a first iteration of a CK method provided by the present invention, a bottleneck set ("B") is computed and AP c is identified as being contained in the set. In addition, the power level of c is reduced to 1. Consequently, $u_3$ changes its association to AP b. The new user-AP associations and loads are shown in FIG. 5(*c*). Note that b is still the congested AP. However, additional reductions in the power level used by AP c to transmit beacon messages will cause user $u_4$ to change its association to AP b, causing the load on AP b to become 17. Thus, in a second iteration illustrated in FIG. 5(*d*), the bottleneck set will contain both c and b. This is the last iteration, since $p_c=0$. The final state shown in FIG. 5(*d*) minimizes congestion but does not balance the loads on the non-congested APs. This is left to a second step of the present invention discussed later on.

In yet a further discovery, the inventors discovered that the CK methods provided by the present invention always find an optimal state that minimizes the congestion load of a WLAN. The inventors developed proofs to support this discovery. These proofs, however, are not necessary for an understanding of the present invention and have been omitted for the sake of clarity and brevity. For example, the proofs are not necessary for an understanding of how the CK methods may be used to minimize congestion.

We now turn our attention to an alternative embodiment of the present invention which may be used to minimize congestion when it is not feasible to obtain complete knowledge of a WLAN. This second embodiment is the LK method(s). Unlike CK methods, a bottleneck set of APs cannot be computed in advance.

This hurdle, however, was overcome by the present inventors when they discovered that as long as a network's (e.g., a WLAN) state is sub-optimal (e.g., the loads on APs in a WLAN are unbalanced) and this state dominates an optimal solution, a sequence of simultaneous reductions to the power levels of beacon signals associated with a set of congested APs results in convergence to an optimal state (i.e., to optimal power levels that balance the loads within a WLAN). This discovery created a dilemma of its own: the challenge of identifying a termination condition (i.e., when to stop the reductions) that is associated with such an optimal solution. Without a termination condition the sequence of reductions may have ended up generating a sub-optimal solution. To determine such a condition, the LK methods provided by the present invention use an optimal state recording approach that records/stores the transmission power levels of all APs that correspond to a lowest congestion load. In more detail, the optimal state recording approach defines two variables. The first keeps a recorded state (e.g., levels) and the second keeps a congestion load value associated with the recorded state, referred to as the recorded congestion load.

In accordance with one embodiment of the invention an LK method comprises the following steps. Initially, the method begins where all APs are operating in a maximal power state (e.g., maximum power levels) where a recorded state (e.g. power levels) and recorded congestion load are initialized to some value. Then, the set D of congested APs are iteratively computed, and, as long as the set D does not contain an AP at a minimal power level, it iteratively reduces the power levels of the APs in set D. After each iteration a current congestion load of the new state is measured, and if the current, measured load is lower than a previously stored/recorded congestion load, then the current (reduced) power levels and current congested load are stored in place of the previously computed levels and load. In the last iteration the power levels of the APs are set using the last stored/recorded (reduced) power levels/state. An example of a software program for carrying out an LK method of the present invention is shown in FIG. 6. An example of how this method maybe executed by a controller or the like is as follows.

Figure 5A:
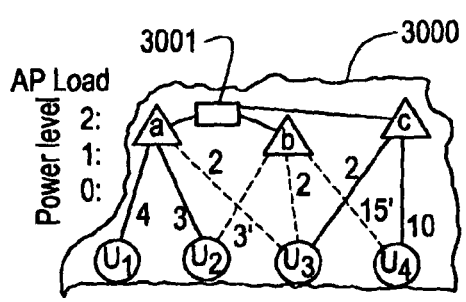
FIGS. 5(a) through (d) depict examples of changes to a WLAN as a result of the execution of the compete knowledge method of the present invention.
Figure 5B:
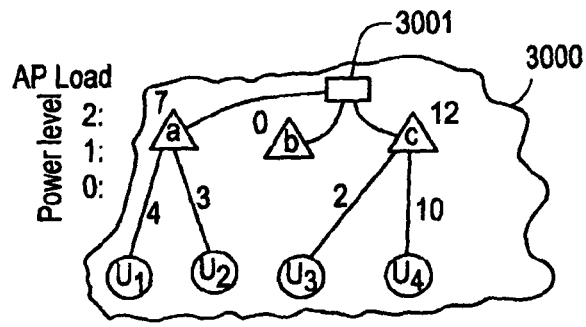
Figure 5C:
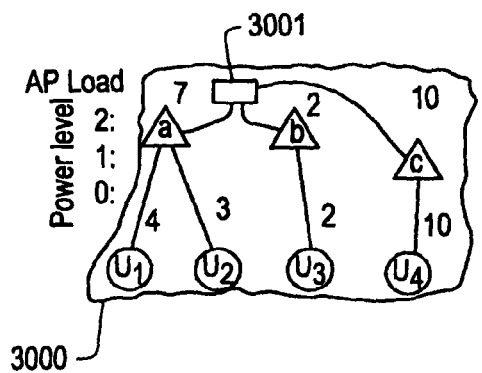
Figure 5D:
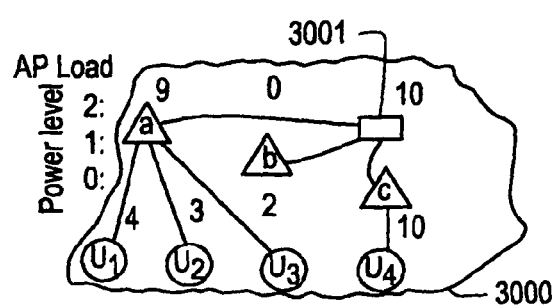
Figure 7A:
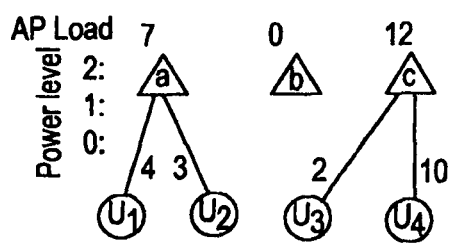
FIGS. 7(a) through (d) depict examples of changes to a WLAN as a result of the execution of the limited knowledge method of the present invention.
Figure 7B:
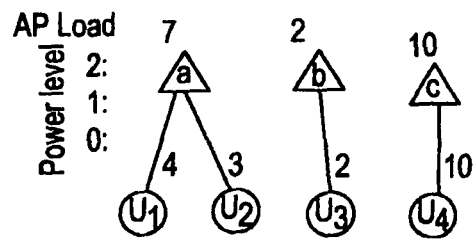
Figure 7C:
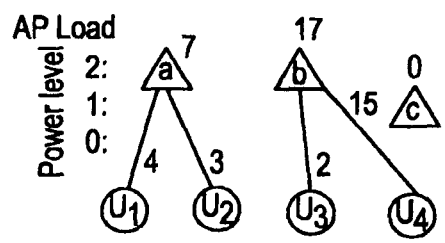
Figure 7D:
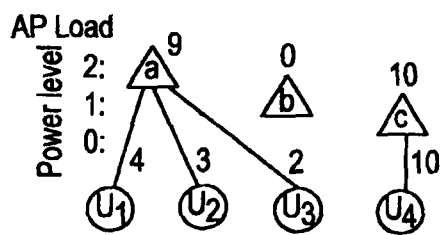

Using the WLAN 3000 shown in FIG. 5(a), it can be seen that at an initial state, all of the APs a, b, and c have the same power level/index, 2. Referring now to FIG. 7(a), exemplary initial user-AP associations and AP loads are shown. In this example, c is the congested AP. In accordance with the present invention, the LK method reduces the power index of AP c twice in two successive iterations, as illustrated in FIGS. 7(b) and 7-(c). After the first iteration, the load on c is reduced from 12 to 10 and this state is recorded/stored. After the second iteration, AP b becomes the congested AP with a congested load of 17. In the third iteration, the LK method reduces the power level/index of AP b and user $u_3$ changes its association accordingly. As a result, AP c becomes the congested AP once again. Because AP c is now transmitting using a minimal power level, the method is terminated. At the end, the method (e.g. a controller) configures the APs a, b and c using the recorded state (e.g., assigns power levels to the APs), as illustrated in FIG. 7(b).

As mentioned before, the inventors discovered that the LK method always finds an optimal state that minimizes the network congestion load. Again, though the inventors developed detailed proofs of this discovery, they have been omitted to keep the present discussion as simple as possible.

The complete and limited knowledge methods discussed above minimize network congestion loads but do not necessarily balance the load on non-congested APs. Realizing this, the present invention provides for methods (and associated devices, e.g. controllers) that do both.

Unfortunately, achieving this typically requires solving problems which are "NP-hard" (i.e., the time it takes to arrive at a solution cannot be determined) and it is hard to find even an approximate solution. In spite of this, the present inventors discovered a variant of the min-max problem, referred to as the min-max priority-load balancing problem, and further discovered an optimal solution to this variant which can be found in polynomial time (i.e., in a time period which can be determined/approximated).

Before presenting the solution discovered by the inventors, we first present some additional background information.

A commonly used approach to evaluate the quality of a load balancing method is to determine whether or not it generates a minimum-maximum ("min-max") load balanced solution. Informally, a network state is considered to be min-max load balanced if there is no way to reduce the load of any AP without increasing the load of another AP with the same or higher load. The inventors define a load vector, Y, of a state S to be the set consisting of the load of each AP sorted in decreasing order. Further, a feasible network state S is said to be min-max load balanced if its corresponding load vector Y has the same or lower lexicographical value than any other load vector Y' of any other feasible state S'.

As indicated above, the problem of finding a min-max load balanced state is an NP-hard problem to solve. It should be understood that the inventors developed detailed proofs demonstrating this but, as before, these proofs have been omitted to simplify the explanation of the present invention. Further, the inventors also developed proofs to demonstrate that even a "simpler" problem, i.e., the problem of identifying the minimal set of congested APs for a known minimal congestion load, is by itself NP-hard. These proofs have also been omitted.

Realizing that the solutions to these problems were NP-hard, the inventors next discovered a variant of the min-max load balancing problem and then discovered an optimal solution to this variant that can be calculated in polynomial time. In the variant discovered by the inventors, it is assumed that each AP a within a set of APs has a unique priority, also termed a weight, w. The weight indicates the AP's importance. The inventors also developed a new AP load definition, referred to as a priority load.

For example, consider an AP a with priority $w_a$, and let $l_a$ be the aggregated load of all of its associated users. The priority load of AP a, denoted by $y_a$, is defined as the ordered pair $y_a=(l_a, w_a)$. For simplicity we refer to an AP's priority load as "AP load". Therefore, it can be said that AP a has higher load than AP b if $y_a=(l_a,w_a)$ has a higher lexicographically value than $y_b=(l_b, w_b,)$ (i.e., one of the following conditions is satisfied: (1) $l_a>l_b$, or (2) $l_a=l_b$ and $w_a>w_b$).

Because there are no two APs with the same priority, it follows that there are no two AP with the same (priority) load. This realization led the inventors to discover the following property: at any network state, the set of congested APs always contains a single AP ("Property 1").

After discovering a variant of the min-max load balancing problem, the inventors then set to work on finding a solution to this problem. The solutions they discovered are discussed in the paragraphs which follow.

To simplify the explanation that follows, the new min-max load balancing methods discovered by the present invention will be presented in combination with the LK model described previously. That said, it should be understood that the min-max methods may also be used in combination with the CK model as well.

In an embodiment of the invention, a min-max load balancing method provided by the present invention iteratively identifies a min-max priority load balanced state that yields an optimal load vector, Y*. Further, at any iteration m, the method incorporates a routine, such as the LK or CK methods/models discussed above, to compute a network state that minimizes the priority-load of the m-th coordinate of the load vector. The min-max methods provided by the present invention satisfy two requirements:

(1) The initial state of each iteration, m, should dominate the optimal state; and
(2) The calculated network state at the m-th iteration should not affect (increase) the load on APs that have already been determined by previous iterations.

To meet the first requirement, one min-max method provided by the present invention begins at a maximal power state in the first iteration and ensures that each iteration ends with a dominate state of an optimal solution. Moreover, to meet the second requirement, a set of fixed APs, F, whose loads have already been determined by previous iterations is defined. Initially, the set F is empty. At each iteration a new AP is added to it, until F contains all of the APs. We define a congestion load, Y, as the maximal load on any non-fixed AP. From Property 1 it follows that at any given time there is only a single non-fixed AP, termed the congested AP, d, that is associated with the congestion load.

At each iteration m the min-max method may invoke a LK method (or CK method) to minimize the m-th coordinate of the load vector. Assuming that the first requirement is satisfied at the beginning of the iteration, three variables are generated and stored: (1) a recorded congestion load, Y, that indicates the congestion load value of the optimal state found so far; (2) a recorded state variable, S, that indicates the first discovered state with congestion load Y; and (3) a recorded congestion AP, d, that identifies the AP that is associated with the congested load.

In accordance with a further embodiment of the invention, the min-max method first initializes the variables S, Y and d. Then, the method iteratively identifies the congested AP and it stops if the congested AP is already transmitting at a minimal power level. If not, the method reduces the power levels of the congested AP and evaluates the congestion load as well as the load of the fixed APs (i.e., those APs whose transmission power levels have already been computed in a previous iteration are now "fixed" or set). The method stops if one of the fixed APs suffers from an elevated load. This ensures the second requirement is met in order to preserve the load of the fixed APs. Otherwise, if a state with a lower congestion load is discovered the method keeps a record of this state by updating the variables. Finally, the method involves setting the power levels of the APs according to the last stored state (power levels) and returns the recorded state S and the corresponding congested AP d. Said another way, after a power level reduction the power level of one AP becomes fixed. This AP is then added to the set of fixed APs. If there are one or more APs remaining whose power level has not been fixed, the method continues by computing the power level of another non-fixed AP.

The method may invoke either the LK or CK methods/models for minimizing the load of the (m+1)-th coordinate once again. An example of a software program or routine representing a min-max method provided by the present invention is shown in FIG. 8. The following is one example of how a controller may be implemented to execute the min-max method provided by the present invention.

Figure 9A:
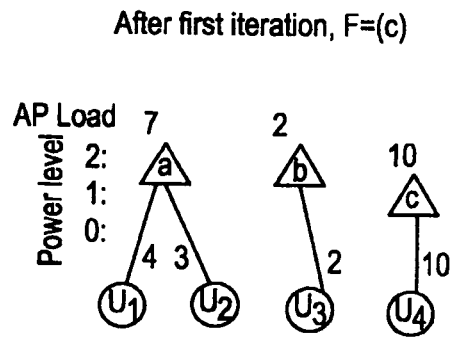
FIGS. 9(a) and (b) depict examples of changes to a WLAN as a result of the execution of the min-max priority load balancing method of the present invention.
Figure 9B:
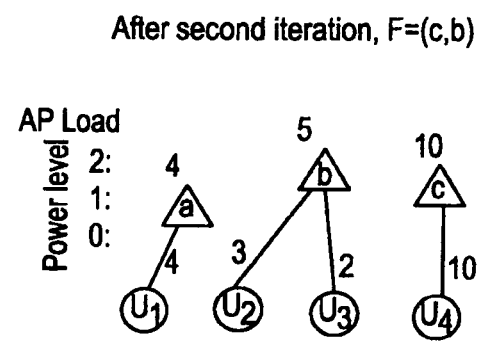

Once again, consider the WLAN 3000 shown in FIG. 5(a). After a first invocation of an LK method, the network state depicted in FIG. 9(a) is generated. As demonstrated before, this state dominates any other state that minimizes the first coordinate of the load vector. A second invocation of the LK method generates the state shown in FIG. 9(b), which is the only min-max load balanced state of this network (regardless of AP priorities).

The inventors discovered that the min-max load balancing methods provided by the present invention always find the optimal load vector and a min-max load balanced solution. The proofs, as before, have been omitted to further simplify the discussion of the present invention.

Before moving on to a discussion of other features of the present invention one additional point is worthy of note. It can be shown (through proofs developed by the inventors) that the complexity of the min-max methods discovered by the present inventors is $O(K-/A/^4-/U)$(see FIG. 14, lines 6, 1 and 13 respectively for definitions of K, <A and U.

As has been mentioned before, each of the methods provided by the present invention may be executed by a controller or the like. Further, once a NOC has executed any one of the methods described above, it may be further operable to exchange messages, instructions and the like with each AP within a WLAN it is a part of in order to ensure that the APs implement the power level reductions and user assignment/association operations that are generated when the controller executes the methods provided by the present invention.

That said, to require a controller or the like to execute the optimization methods described above every time a user arrives or departs from a WLAN may lead to frequent association changes and the potential disruption of on-going user sessions. To avoid this, the inventors developed an on-line strategy that strikes a balance between the number of association changes and the desire to maintain an optimal, load balanced WLAN. The underlying concepts of such an on-line strategy combine "global optimization" and "local optimization".

Local optimization is a strategy where the load of a WLAN is continually balanced each time a user arrives and/or departs, while global optimization involves a strategy where the methods provided by the present invention are only invoked periodically or whenever a local optimization strategy fails to maintain a load-balanced state. In accordance with an embodiment of the present invention, an on-line strategy uses three configuration parameters: a minimal load threshold, a cell adaptation threshold, and a time threshold. The first two parameters determine when to invoke local optimization in order to prevent the use of such optimization when it would only result in negligible gains, and to prevent service interruptions to active users. The last parameter controls how often global optimization may be invoked.

Local optimization methods are different from global optimization methods because they may decrease, or increase an AP's power level as explained briefly below.

In a local optimization method provided by the present invention, for each AP a, we define a set $N_a$ of all of its neighboring APs and let $y_a$ be the average load on the APs in $N_a$. When the load on an AP a is reduced for whatever reason (e.g., user movements or local optimization operations), the on-line method(s) provided by the present invention check to see whether or not the new load $y_a$ satisfies a cell enlargement condition, which is determining whether or not an AP b in the set of neighboring APs has a load that is greater than the minimal load threshold and the new load $y_a$ has a value that is less than a value computed by multiplying the average load of the APs in $N_a$ by the value (1− the cell adaption threshold). If this condition is satisfied and the power index, $p_a$, of AP a is not maximal the on-line method of the present invention increases the AP a's power level by one.

Conversely, when the load on the AP a increases, the on-line method of the present invention checks a cell reduction condition, which is determining whether or not $y_a$ is greater than the minimal load threshold and greater than a value computed by multiplying the average load of the APs in $N_a$ by the value (1+ the cell adaption threshold). If this condition is satisfied and the power index $p_a$ of AP a is not minimal, the on-line method reduces AP a's power level by one.

Lastly, if either of the two conditions are satisfied, but local optimization operations cannot adjust the power level, then global optimization is invoked.

The inventors conducted simulations to compare the performance of their novel load balancing methods with two existing methods; a Strongest-Signal-First (SSF) method and an association control method. SSF is the default user-AP association method used in the IEEE 802.11 standard. The association control method determines user-AP associations to achieve a max-min fair bandwidth allocation, not to determine associations purely based on signal strength. Because the max-min fairness problem is NP-hard, the association control method first calculates a fractional optimal solution (FRAC) under the assumption that a user can be simultaneously associated with multiple APs, and then obtains an integral solution (INT) via rounding to satisfy a single association constraint. The inventors chose these methods as benchmarks because the characteristics of their solutions are known.

FRAC solutions provide a strict performance upper bound (i.e., lowest possible congestion load) while INT guarantees a 2-approximation type solution. Furthermore, INT converges with FRAC as the number of users increases. The inventors did not expect their methods to outperform optimal association control methods that have significantly higher degrees of freedom. The inventors' objective in comparing the INT solution to their methods was to show that their methods achieve comparable performance to the association control method without the need for special client software on each mobile which is needed in the INT method. Surprisingly, however, the results from the inventor's simulations indicate that the methods provided by the present invention outperform the INT solution in various load conditions.

Figure 10:
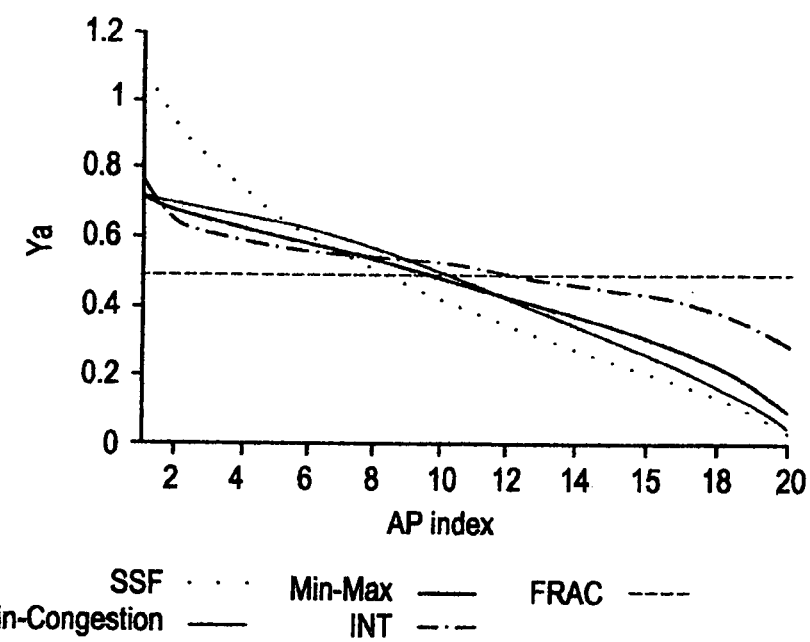
FIGS. 10 through 13 depict graphs that illustrate the differences between methods provided by the present invention and existing load balancing methods.

The details of how the simulations were conducted have been omitted to simplify our discussion. Instead, the inventors have included sample graphs of their simulation results. For example, FIG. 10 depicts simulation results involving a comparison of load balancing techniques that included 100 randomly distributed users. This number of users was chosen to simulate a moderately loaded network in which the ratio of APs to active users is 5. The Y axis represents $y_a$ (the AP load) while the X axis represents the AP power level/index. It should be noted that the APs are sorted by their $y_a$ values in decreasing order. Each $y_a$ value is obtained by averaging 300 simulation runs. Only the points corresponding to the integer x indices are meaningful (continuous lines are drawn only for presentation purposes). The thick solid line represents the inventors' min-max methods and the thin solid line represents the inventors' minimal congestion methods While both methods generate the same maximal $y_a$ value, it can be seen that the min-max method generates a load vector with a lower lexicographical order than the minimal-congestion methods. The thick dotted line represents an INT solution and the horizontal thin dotted line represents the FRAC solution. Both the min-max and INT solutions are clearly better than the SSF solution. Both yield very similar maximal $y_a$ values, which are about 35% higher than FRAC.

Figure 11:
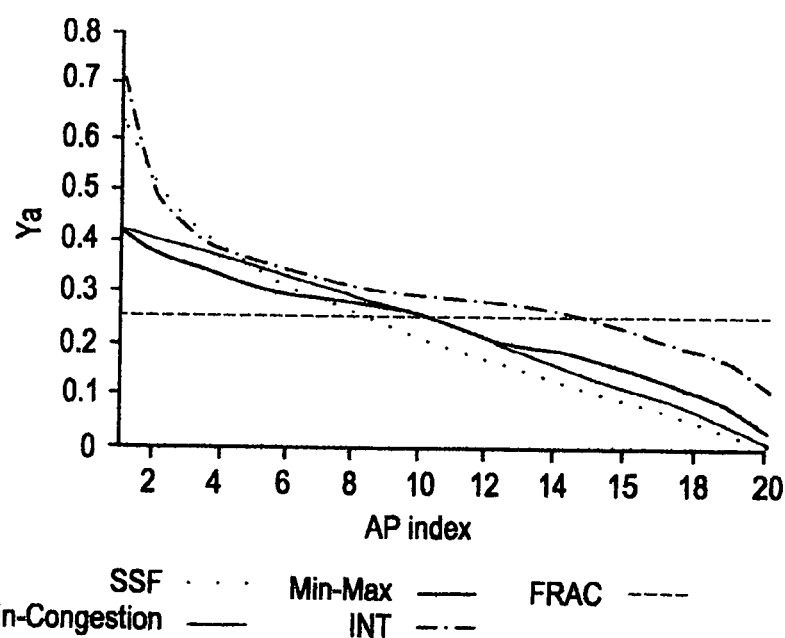

The inventors also ran similar simulations using 50 users, the results of which are shown in FIG. 11. As depicted, the inventors' min-max method(s) outperform the INT method by a significant margin. Interestingly, the relative performance of the inventors' min-max methods when compared to FRAC and SSF does not appear to be drastically affected by the number of users. The same trend was observed in other simulations conducted by the inventors. For example, when 200 users (not shown in the Figures) was used, the gap between FRAC and the inventors' methods remained at 35%. The steady, relative performance of the inventive min-max methods when compared with FRAC solutions regardless of network load conditions (i.e., number of users) is one of the many strengths of the methods provided by the present invention.

Figure 12:
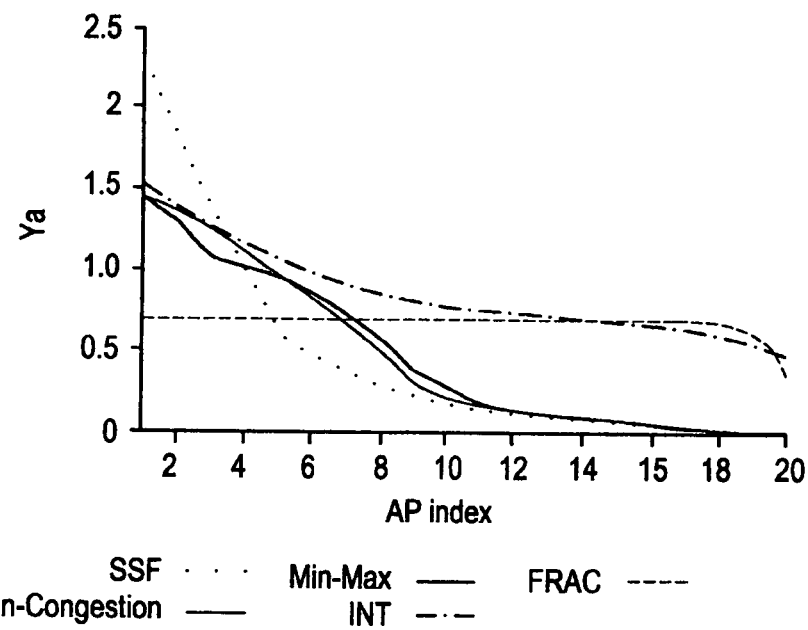

The inventors also considered the case of unbalanced user distributions. For example, where only 20% of the users are randomly distributed and the rest are concentrated on two hotspots which do not overlap with each other. Each hotspot may be a circle-shape area with a 75 meter radius. One hotspot may contain twice as many users than the other. This setting causes a heavy load condition in the hotspots. FIG. 12 depicts exemplary results when the total number of users is 100. It shows that the min-max methods provided by the present invention perform even better in the presence of hotspots (i.e., heavy load conditions) and is superior to INT.

Figure 13:
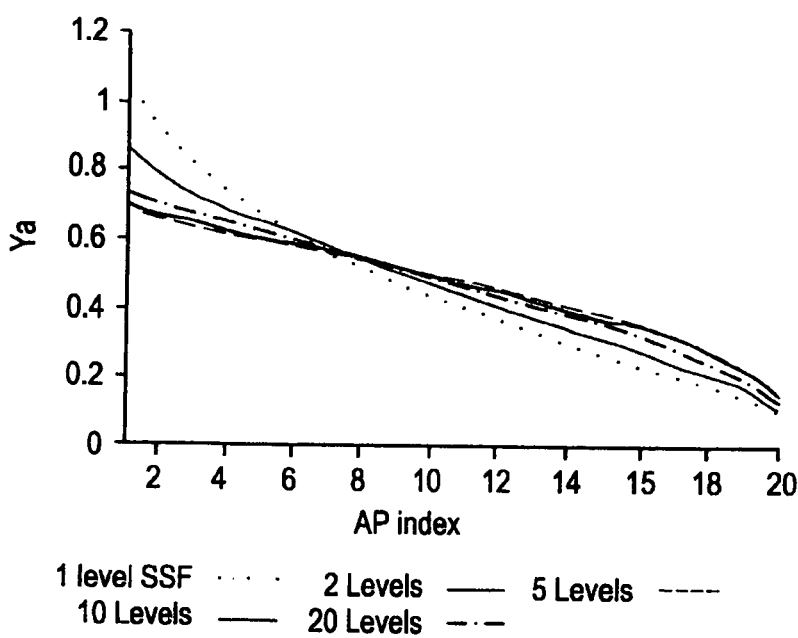

To examine the impact of the number of power levels (up until now the examples described have used 10 power levels), the inventors simulated 4 different ranges of power levels. The results are shown in FIG. 13. As shown, the impact of the number of power levels becomes marginal beyond a certain number of power levels, which is between 5 and 10 in the simulations conducted by the present inventors To have an understanding of how many operations a controller might have to carry out when executing a LK method of the present invention, the inventors carried out a simulation of such a method and counted the number of power level adjustments and user association changes. The collected statistics are summarized in FIG. 15. For each table entry, two numbers are given; the first number is for a min-max method that evoked a LK method while the second number is for the LK (minimal congestion) method/model only. Generally, the later method converges fairly quickly, while the former takes a little longer. For instance, if the power adjustment interval is 1 second, load-balancing in a 100 random user network takes about 33 seconds using the LK (minimal-congestion) method/model, and less than 2 minutes using the min-max method that evokes a LK method. An increase in the number of users does not seem to necessarily increase the convergence time, nor does the presence of hotspots. In fact, using the LK (minimal congestion) method/model, it decreases.

The discussion above has set forth some examples of the present invention. The true scope of the present invention, however, is determined by the claims that follow.

We claim:

1. A method for balancing loads within a wireless network comprising:
    changing a current power level of one or more beacon messages transmitted by one or more access points (APs) in the network while at the same time maintaining a current power level of one or more data traffic channels of the APs.

2. The method as in claim 1 further comprising collecting information regarding a load on each AP and one or more users assigned to each AP.

3. The method as in claim 2 wherein the information comprises a current load and current user assignments for each AP.

4. The method as in claim 2 wherein the information comprises potential loads and potential user assignments for each AP.

5. The method as in claim 1 further comprising minimizing loads on congested APs within the network in a polynomial time period.

6. The method as in claim 1 further comprising minimizing loads on congested APs and balancing loads on non-congested APs within the network in a polynomial time period.

7. The method as in claim 3 further comprising:
    determining a maximum beacon message power level for each AP that is equal to, or greater than, an optimum power level setting for the AP;
    iteratively and gradually reducing a beacon message power level of congested APs in the network from the determined power level until optimum power levels for all of the congested APs are reached;
    storing a set of beacon message power levels that is associated with one of the reductions and is further associated with a balanced load state in the network; and
    applying the set of beacon message power levels to the congested APs to minimize congestion.

8. The method as in claim 7 further comprising:
    determining a congestion load after each iterative power level reduction;
    comparing the determined load to a stored, current lowest congestion load;
    storing the determined load as a next lowest congestion load if the determined load is lower than the current lowest load; and applying beacon message power levels, associated with a stored lowest congestion load after a final iteration, to the congested APs to minimize congestion.

9. The method as in claim 4 further comprising:
iteratively determining a minimal set of APs in the network where each AP in the set is a congested AP having a congested load or an AP whose load may increase to a congested load due to a reduction in power level;
determining a maximum beacon message power level for each AP in the minimal set that is equal to, or greater than, an optimum beacon message power level setting for the AP;
reducing a beacon message power level of congested APs in the minimal set from the determined power level using one or more iterative reductions until optimum beacon message power levels for all of the APs in the set are reached; and
applying the set of beacon message power levels to the congested APs to minimize congestion.

10. The method as in claim 6 further comprising:
determining a beacon message maximum power level for each AP that is equal to, or greater than, an optimum beacon message power level setting for the AP;
iteratively reducing a beacon message power level of a congested AP, that is not a part of a stored set of identified APs, in the network starting from the determined power level;
after each iteration, storing a beacon message power level and identification for one or more congested APs whose optimum power level has been determined, and determining a next congested AP from APs whose optimum power level has not yet been determined;
repeating the iterative reduction step from a next reduced power level until each of the AP's optimum power level has been determined; and
applying the stored beacon message power levels to the APs to minimize congestion.

11. The method as in claim 1 further comprising:
when a load on an AP is reduced, determining whether or not a new load on the AP satisfies a cell enlargement condition, said condition including determining whether or not a neighboring AP in a set of neighboring APs has a load that is greater than a minimal load threshold and the new load has a value that is less than a value computed by multiplying an average load of all of the neighboring APs by the value (1− a cell adaption threshold), and if the condition is met and the AP's power level can be adjusted, increasing the beacon message power level of the AP; or
when the load on the AP increases, determining whether or not the new load satisfies a cell reduction condition, said condition including determining whether or not a neighboring AP in the set of neighboring APs has a load that is greater than the minimal load threshold and greater than a value computed by multiplying the average load of all of the neighboring APs by the value (1+ the cell adaption threshold), and if the cell reduction threshold condition is met and the AP's power level can be adjusted, reducing the beacon message power level of the AP; and
when either condition is met but the beacon message power level of the AP cannot be adjusted, invoking a global, load balancing optimization method that determines optimal beacon message power levels of the APs within the WLAN, where the message power levels are optimized without affecting data channel power levels of the APs.

12. The method as in claim 1 wherein the network is a wireless, local area network (LAN).

13. A system for balancing loads on access points (APs) within a wireless network, the system comprising at least one controller operable to:
change a current power level of one or more beacon messages transmitted by one or more APs in the network while at the same time maintaining a current power level of one or more data traffic channels of the APs.

14. The system as in claim 13 wherein the controller is further operable to collect information regarding a load on each AP and one or more users assigned to each AP.

15. The system as in claim 13 wherein the information comprises a current load and current user assignments for each AP.

16. The system as in claim 13 wherein the information comprises potential loads and potential user assignments for each AP.

17. The system as in claim 13 wherein the controller is further operable to minimize a load on congested APs within the network in a polynomial time period.

18. The system as in claim 13 wherein the controller is further operable to minimize a load on congested APs and balance loads on non-congested APs within the network in a polynomial time period.

19. The system as in claim 15 wherein the controller is further operable to:
determine a maximum beacon message power level for each AP that is equal to, or greater than, an optimum power level setting for the AP;
iteratively and gradually reduce a beacon message power level of congested APs in the network from the determined power level until optimum power levels for all of the congested APs are reached;
store a set of beacon message power levels that is associated with one of the reductions and is further associated with a balanced load state in the network; and
apply the set of beacon message power levels to the congested APs to minimize congestion.

20. The system as in claim 19 wherein the controller is further operable to:
determine a congestion load after each iterative power level reduction;
compare the determined load to a stored, current lowest congestion load;
store the determined load as a next lowest congestion load if the determined load is lower than the current lowest load; and
beacon message power levels, associated with a stored lowest congestion load after a final iteration, to the congested APs to minimize congestion.

21. The system as in claim 16 wherein the controller is further operable to:
iteratively determine a minimal set of APs in the network where each AP in the set is a congested AP having a congested load or an AP whose load may increase to the congested load due to a reduction in power level;
determine a maximum beacon message power level for each AP in the minimal set that is equal to, or greater than, an optimum beacon message power level setting for the AP;
reduce a beacon message power level of congested APs in the minimal set from the determined power level using one or more iterative reductions until optimum beacon message power levels for all of the APs in the set are reached; and apply the set of beacon message power levels to the congested APs to minimize congestion.

22. The system as in claim 18 wherein the controller is further operable to:
   determine a beacon message maximum power level for each AP that is equal to, or greater than, an optimum beacon message power level setting for the AP;
   iteratively reduce a beacon message power level of a congested AP, that is not a part of a stored set of identified APs, in the network starting from the determined power level;
   after each iteration, store a beacon message power level and identification for one or more congested APs whose optimum power level has been determined, and determining a next congested AP from APs whose optimum power level has not yet been determined;
   repeat the iterative reduction step from a next reduced power level until each of the AP's optimum power level has been determined; and
   apply the stored beacon message power levels to the APs to minimize congestion.

23. The system as in claim 13 wherein the controller is further operable to:
   when a load on an AP is reduced, determine whether or not a new load on the AP satisfies a cell enlargement condition, said condition including determining whether or not a neighboring AP in a set of neighboring APs has a load that is greater than a minimal load threshold and the new load has a value that is less than a value computed by multiplying an average load of all of the neighboring APs by the value (1 − a cell adaption threshold), and if the condition is met and the AP's power level can be adjusted, increase the beacon message power level of the AP; or
   when the load on the AP increases, determine whether or not the new load satisfies a cell reduction condition, said condition including determining whether or not a neighboring AP in the set of neighboring APs has a load that is greater than the minimal load threshold and greater than a value computed by multiplying the average load of all of the neighboring APs by the value (1+ the cell adaption threshold), and if the cell reduction threshold condition is met and the AP's power level can be adjusted, reduce the beacon message power level of the AP; and
   when either condition is met but the beacon message power level of the AP cannot be adjusted, invoke global, load balancing optimization to determine optimal beacon message power levels of the APs within the WLAN, where the message power levels are optimized without affecting data channel power levels of the APs.

24. The system as in claim 13 wherein the network is a WLAN.

25. The system as in claim 13 further comprising one or more access points (APs), each AP operable to:
   receive one or more messages related to beacon message power level reductions and user associations; and
   implement the reductions and user associations according to the received messages while maintaining a power level of a data traffic channel.

26. method for balancing loads within a wireless network comprising:
   computing a set of congested APs;
   iteratively reducing a power level of a beacon message of each AP in the set provided no AP within the set is operating at a minimal power level;
   after each iteration, measuring a current congestion load and comparing the current load to a previously stored congestion load;
   storing the current congestion load and reduced power levels when the current load is less than the previously stored load; and
   setting the power level of each AP to a level associated with a last stored, reduced power level.

* * * * *